(12) United States Patent
Suneya (10) Patent No.: US 11,303,940 B2
(45) Date of Patent: Apr. 12, 2022

(54) TRANSMISSION APPARATUS, TRANSMISSION METHOD, AND NON-TRANSITORY COMPUTER-READABLE STORAGE MEDIUM

(71) Applicant: CANON KABUSHIKI KAISHA, Tokyo (JP)

(72) Inventor: Toru Suneya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/797,595

(22) Filed: Feb. 21, 2020

(65) Prior Publication Data
US 2020/0275135 A1 Aug. 27, 2020

(30) Foreign Application Priority Data
Feb. 27, 2019 (JP) .............................. JP2019-034736

(51) Int. Cl.
| | |
|---|---|
| H04N 21/2343 | (2011.01) |
| H04N 21/643 | (2011.01) |
| H04N 21/858 | (2011.01) |
| H04N 21/262 | (2011.01) |
| H04N 21/845 | (2011.01) |
| H04N 21/239 | (2011.01) |

(52) U.S. Cl.
CPC ..... *H04N 21/2343* (2013.01); *H04N 21/2393* (2013.01); *H04N 21/26258* (2013.01); *H04N 21/643* (2013.01); *H04N 21/8456* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 2004/0073936 A1* | 4/2004 | Kurauchi | H04N 21/2665 725/90 |
| 2004/0231004 A1* | 11/2004 | Seo | H04N 21/4402 725/142 |
| 2011/0161517 A1* | 6/2011 | Ferguson | H04N 21/23424 709/231 |
| 2015/0156511 A1* | 6/2015 | Lundberg | H04N 19/146 375/240.12 |
| 2016/0065994 A1* | 3/2016 | Kokaska | H04N 21/2365 375/240.26 |
| 2016/0142750 A1* | 5/2016 | Huber | H04L 65/4084 725/116 |

* cited by examiner

*Primary Examiner* — James R Marandi
(74) *Attorney, Agent, or Firm* — Rossi, Kimms & McDowell LLP (57) ABSTRACT

A transmission apparatus that transmits media data to a reception apparatus generates segments each corresponding to a predetermined time length portion of the media data, the segments including a first segment including predetermined reference data serving as a reference for play of the media data, and a second segment not including the predetermined reference data; and transmits the generated segment to the reception apparatus in response to a request for a segment from the reception apparatus. In the transmitting, based on that the segment requested by the reception apparatus is the second segment, the second segment is changed to the first segment and transmitted to the reception apparatus.

11 Claims, 6 Drawing Sheets

TRANSMISSION APPARATUS, TRANSMISSION METHOD, AND NON-TRANSITORY COMPUTER-READABLE STORAGE MEDIUM

BACKGROUND OF THE INVENTION

Field of the Invention

The present invention relates to a media data distribution technique.

Description of the Related Art

There is a system that distributes a streaming content formed by audio data, video data, or the like in real time, and allows a user to listen to or view such a content via a terminal apparatus held by the user. At this time, since the terminal apparatus has various capabilities and executes play of the content in various environments, a technique for adapting to the content play environment is required. Regarding such a request, MPEG (Moving Picture Experts Group)-DASH (Dynamic Adaptive Streaming over Http) has attracted attention (see, ISO/IEC 23009-1). MPEG-DASH is a video distribution standard that enables dynamically changing the stream to be obtained.

In MPEG-DASH, video data is divided into segments each having a predetermined time length, and a URL (Uniform Resource Locator) for obtaining the segment is described in a file called a playlist. A receiving-side apparatus that receives the video data first obtains the playlist, selects the video data to be requested using the information described in the playlist, and requests a distribution-side apparatus of a distribution source of the selected video data to distribute the video data. Then, the receiving-side apparatus obtains the video data from the distribution-side apparatus. Note that this video data can be obtained as a segment obtained by dividing one video data. At this time, by describing, in the playlist, URLs for a plurality of versions of the segment having different bit rates or resolutions, the receiving-side apparatus can obtain the segment of a version suitable for its capability or the communication environment.

The segments are handled in a file format of ISO Base Media File Format (this format is referred to as "ISOBMFF" hereinafter) (see, ISO/IEC 14496-12). Here, the ISOBMFF is roughly divided into a portion for storing header information and a portion for storing encoded data. The header information includes, for example, information indicating the size of the encoded data stored in the segment or a time stamp. Therefore, in order to complete one segment, it is required that the encoded data to be stored in the segment is completely generated.

On the other hand, regarding the segments of video data, data encoded using inter-frame prediction such as H.264 is generally used. Based on this, DASH Industry Forum (http://dashif.org/) as an industry organization that promotes MPEG-DASH has created guidelines to facilitate switching to the optimal version of the segment. For example, the guidelines define that each segment includes a frame (this frame is referred to as an "I-Frame" hereinafter) compressed in an intra-frame manner that can be decoded singly, and is randomly accessible.

Since the I-Frame has a larger code amount than a frame in which the difference between a reference image and a predicted image is compressed, a method of prolonging the interval of generating the I-Frame may be used to suppress the code amount. At this time, when the DASH Industry Forum guidelines are obeyed, each segment needs to include at least one I-Frame, so that the shortest time length of the segment is the generation interval of the I-Frame. Therefore, the shortest time length of the segment becomes longer in accordance with the I-Frame interval.

In a case of streaming distribution of a live video, a segment cannot be distributed until encoding of the last frame constituting the one segment is completed and the header of the segment is generated. Accordingly, the time length of the segment is added intact to the delay time from generation (such as shooting) of video data to distribution. Therefore, the real-time property at the time of live video distribution can be significantly impaired. This problem can become more conspicuous when the generation interval of the I-Frame is prolonged in order to suppress the code amount of the content to be distributed.

SUMMARY OF THE INVENTION

The present invention provides a technique of shortening a delay time related to media data distribution.

According to one aspect of the present invention, there is provided a transmission apparatus that transmits media data to a reception apparatus, comprising: one or more processors; and one or more memories, which stores one or more computer-readable instructions that cause, when executed by the one or more processors, the transmission apparatus to: generate segments each corresponding to a predetermined time length portion of the media data, the segments including a first segment including predetermined reference data serving as a reference for play of the media data, and a second segment not including the predetermined reference data; and transmit the generated segment to the reception apparatus in response to a request for a segment from the reception apparatus, wherein in the transmission, based on that the segment requested by the reception apparatus is the second segment, the second segment is changed to the first segment and transmitted to the reception apparatus.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(System Configuration)

Figure 1:
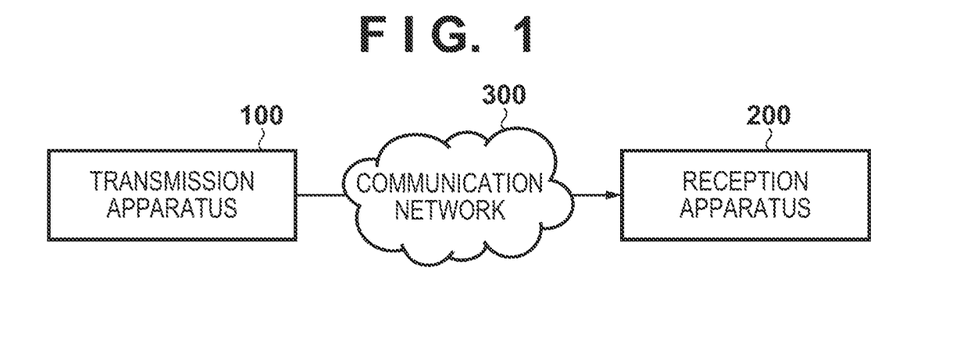
FIG. 1 is a block diagram showing a configuration example of a system.

FIG. 1 shows a configuration example of a content distribution system according to this embodiment. This system is a system configured to distribute a media content such as a video content or an audio content, and includes a transmission apparatus 100 that distributes a media content, and a reception apparatus 200 that receives the media content. In an example, the transmission apparatus 100 is configured to be communicable with the reception apparatus 200 via a communication path 300. Note that one transmission apparatus 100 and one reception apparatus 200 are shown in the example shown in FIG. 1, but for at least one of the apparatuses, a plurality of apparatuses may exist.

The transmission apparatus 100 can be, for example, a camera, a video camera, a smartphone, a PC (Personal Computer), a portable telephone, or the like, but may be another arbitrary electronic device capable of executing the functions to be described later. The reception apparatus 200 can be an arbitrary electronic device such as a smartphone, a PC, a television, or a portable telephone, as long as it has a content play/display function, a communication function, and a function of accepting an input from a user. The communication path 300 can be, for example, an arbitrary communication network regardless of wired communication or wireless communication. The communication network can be any one of various kinds of networks such as the Internet/intranet and a LAN (Local Area Network)/WAN (Wide Area Network). In addition, the wired communication interface can be an interface complying with the Ethernet standard. However, another interface may be used. The wireless communication interface may be an interface complying with a wireless LAN standard complying with the IEEE802.11 standard series, or an interface complying with a standard such as WAN such as 3G/4G/LTE or Bluetooth® may be used. Note that as a wireless connection form, connection in an infrastructure network may be used, or connection in an ad-hoc network may be used. In addition, the communication path 300 may be a combination of a wired communication path and a wireless communication path. That is, the communication path 300 may have an arbitrary form as long as connection is established between the transmission apparatus 100 and the reception apparatus 200, and communication is performed.

(Arrangement of Transmission Apparatus)

Figure 2:
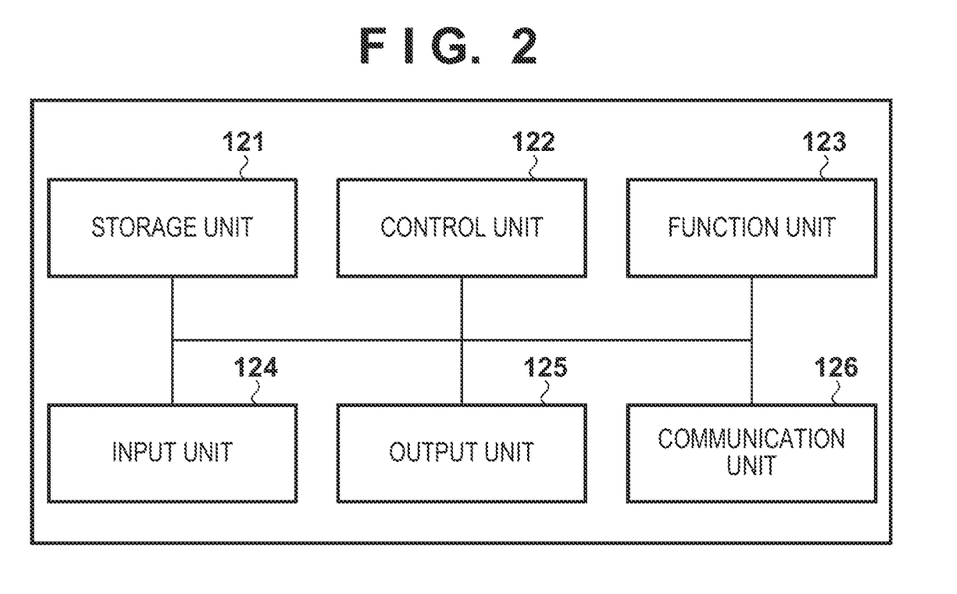
FIG. 2 is a block diagram showing an example of the hardware arrangement of a transmission apparatus.

FIG. 2 shows the hardware arrangement of the transmission apparatus 100 according to this embodiment. The transmission apparatus 100 includes, as its hardware arrangement, for example, a storage unit 121, a control unit 122, a function unit 123, an input unit 124, an output unit 125, and a communication unit 126. Note that the arrangement shown in FIG. 2 is merely an example, and the transmission apparatus 100 may include only part of the arrangement shown in FIG. 2, or may have an arrangement other than that shown in FIG. 2.

The storage unit 121 is formed by one or more memories, that is, both of a ROM and a RAM or one of them, and stores programs configured to perform various kinds of operations to be described later and various kinds of information such as communication parameters for wireless communication. Here, ROM is short for Read Only Memory, and RAM is short for Random Access Memory. Note that other than the memories such as a ROM and a RAM, a storage medium such as a flexible disk, a hard disk, an optical disk, a magnetooptical disk, a CD-ROM, a CD-R, a magnetic tape, a non-volatile memory card, or a DVD may be used as the storage unit 121.

The control unit 122 is formed by, for example, one or more processors such as a CPU and an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 122 executes the programs stored in the storage unit 121, thereby controlling the entire transmission apparatus 100. Note that the control unit 122 may control the entire transmission apparatus 100 by cooperation of the programs stored in the storage unit 121 and an OS (Operating System).

In addition, the control unit 122 controls the function unit 123 to execute predetermined processing such as image capturing, printing, or projection. The function unit 123 is hardware used by the transmission apparatus 100 to execute predetermined processing. For example, if the transmission apparatus 100 is a camera, the function unit 123 is an image capturing unit and performs image capturing processing. Data to be processed by the function unit 123 may be data stored in the storage unit 121, or may be data communicated with an STA via the communication unit 126 to be described later.

The input unit 124 accepts various kinds of operations from the user. The output unit 125 performs various kinds of outputs for the user. Here, the output by the output unit 125 includes at least one of display on a screen, audio output by a speaker, vibration output, and the like. Note that both the input unit 124 and the output unit 125 may be implemented by one module, like a touch panel.

The communication unit 126 controls wired communication or wireless communication, or controls IP communication. The transmission apparatus 100 communicates a media content such as video data or audio data with another communication apparatus (reception apparatus 200) via the communication unit 126.

Figure 3:
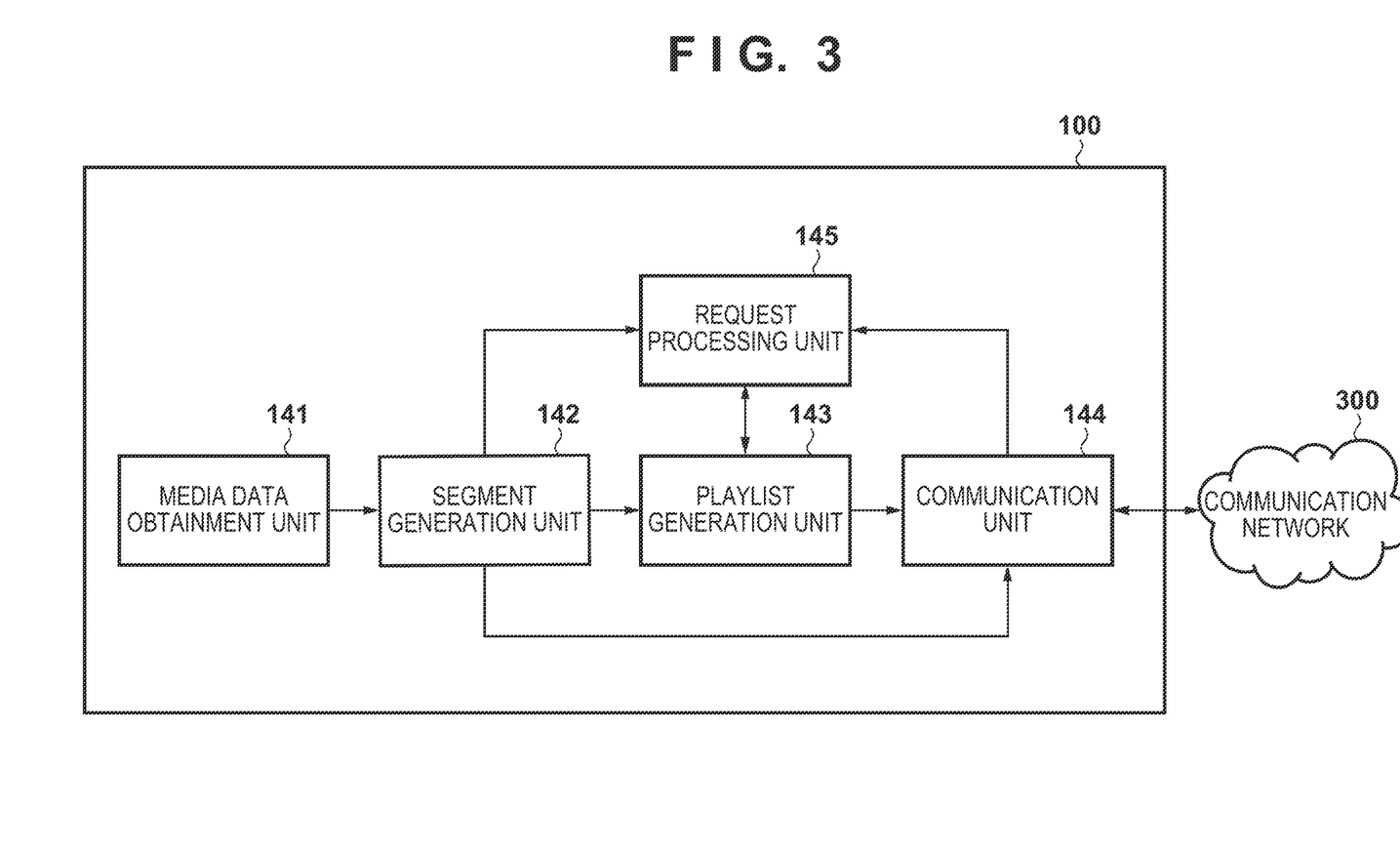
FIG. 3 is a block diagram showing an example of the functional arrangement of the transmission apparatus.

FIG. 3 is a block diagram showing an example of the functional arrangement of the transmission apparatus 100. In an example, the transmission apparatus 100 includes a media data obtainment unit 141, a segment generation unit 142, a playlist generation unit 143, a communication unit 144, and a request processing unit 145. The media data obtainment unit 141 obtains media data such as encoded video data or audio data. The segment generation unit 142 generates segments by combining, at predetermined time intervals, the media data obtained by the media data obtainment unit 141. Based on a notification, from the segment generation unit 142, that the segment has been generated, the playlist generation unit 143 generates a playlist describing an URL which enables obtainment of the segment. The communication unit 144 executes processing such as reception of a request signal from the reception apparatus 200 or transmission of the playlist and the segment via the communication path 300. The request processing unit 145 executes processing for transmitting the generated playlist and segment to the reception apparatus 200 via the communication unit 144 in response to a request from the reception apparatus 200. Note that the functional units shown in FIG. 3 can be implemented in the transmission apparatus as dedicated hardware such as an ASIC or software. If the units are implemented as hardware, a dedicated hardware module in which each or some of the functional units are integrated can be implemented. If the units are implemented as software, programs configured to execute each functional unit are stored in the storage unit 121 of the transmission apparatus described above, and appropriately read out and executed by the processor of the control unit 122.

(Delay of Video Distribution)

Figure 4:
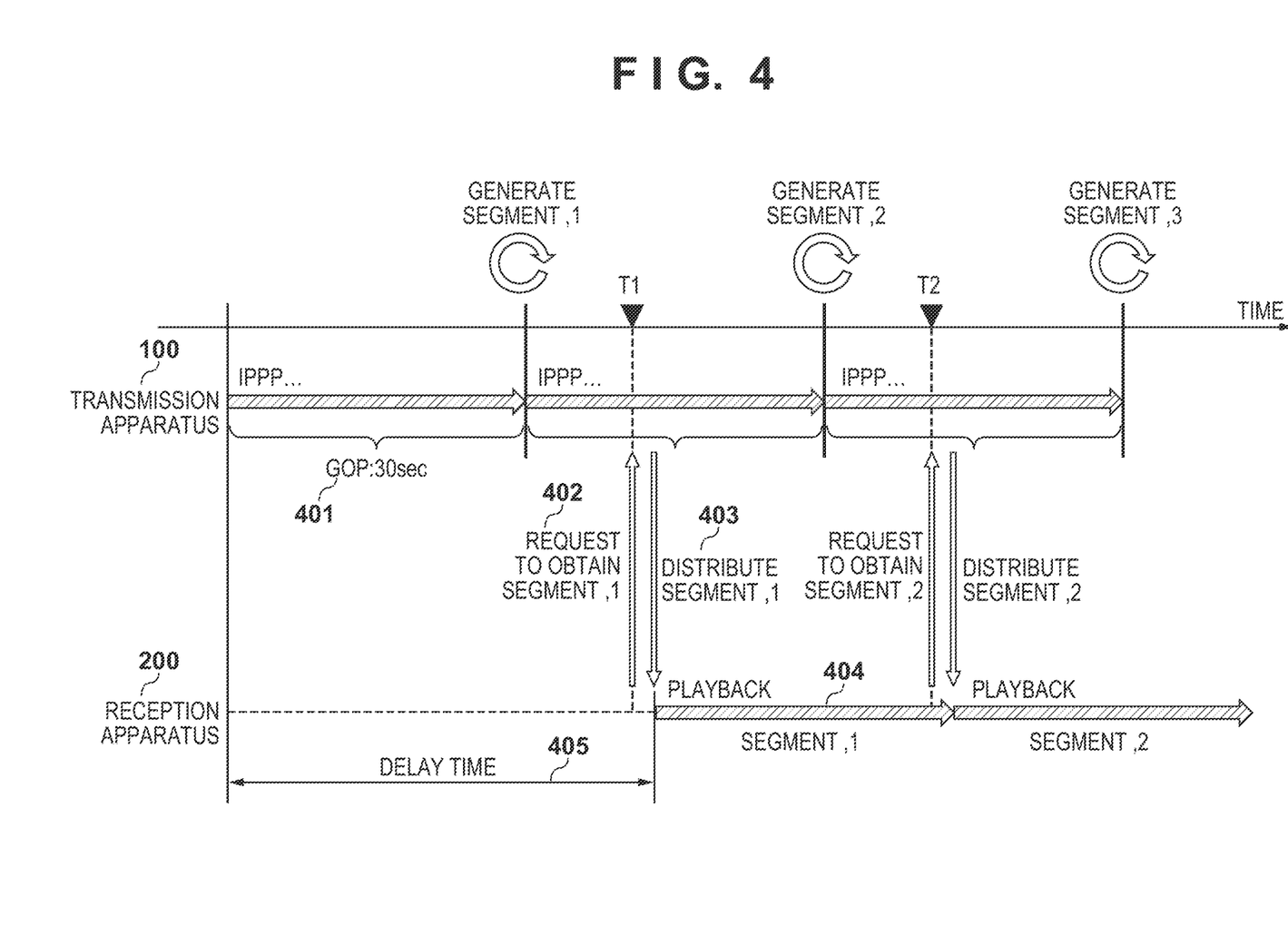
FIG. 4 is a view for explaining how a delay occurs in live video distribution.

Before explaining processing executed by the transmission apparatus 100 in this embodiment, how a delay occurs in live video distribution will be schematically described with reference to FIG. 4. In FIG. 4, the transmission apparatus 100 combines encoded data every 30 sec and generates a header, thereby generating a segment. Here, in a moving image compression technique standardized by MPEG (Moving Picture Expert Group), a group including one or more encoded frame data is called a GOP (Group Of Pictures). In this embodiment, a GOP in which an I-Frame exists only in the start portion and the remaining portion includes P-frames, each of which is a forward reference frame, is taken as an example and described.

In FIG. 4, the encoded data for 30 sec is regarded as one GOP. A GOP 401 is provided with a header after the last frame of the GOP 401 is generated, and a "segment (1)" including the GOP 401 and the header is generated. After receiving a playlist, the reception apparatus 200 requests the transmission apparatus 100 for obtainment of the segment (1) based on the content information described in the playlist. In FIG. 4, when a segment obtainment request 402 is received from the reception apparatus 200 at time TI, the transmission apparatus 100 executes distribution 403 of the generated segment (1), and the reception apparatus 200 executes play processing of the received segment (1).

Subsequently, streaming play is executed by repeating generation, obtainment, and play for each segment. The segment (1) played back in a duration 404 in FIG. 4 is the stored data of the GOP 401, so that a time 405 shown in FIG. 4 becomes a delay time which is a time difference between the actual live video and the play video. The segment that the reception apparatus 200 requests to obtain is expected to be the latest segment among the generated segments. However, as shown in FIG. 4, even if a request is made as expected, a delay corresponding to at least one segment to a maximum of two segments occurs in the delay time 405. That is, as shown in FIG. 4, when the time length of the GOP is 30 sec, a delay of about 30 sec to 1 min occurs. Note that the actual delay time can include various kinds of factors such as a time required for encoding/decoding of video data and a transmission delay on the communication path. However, in this embodiment, the time 405 determined by the time length and obtainment timing of the segment, that greatly influence the delay time, is mainly dealt with.

(Outline of Processing)

Next, an example of a method of reducing the delay time as described above will be described.

<Method 1>

Figure 5:
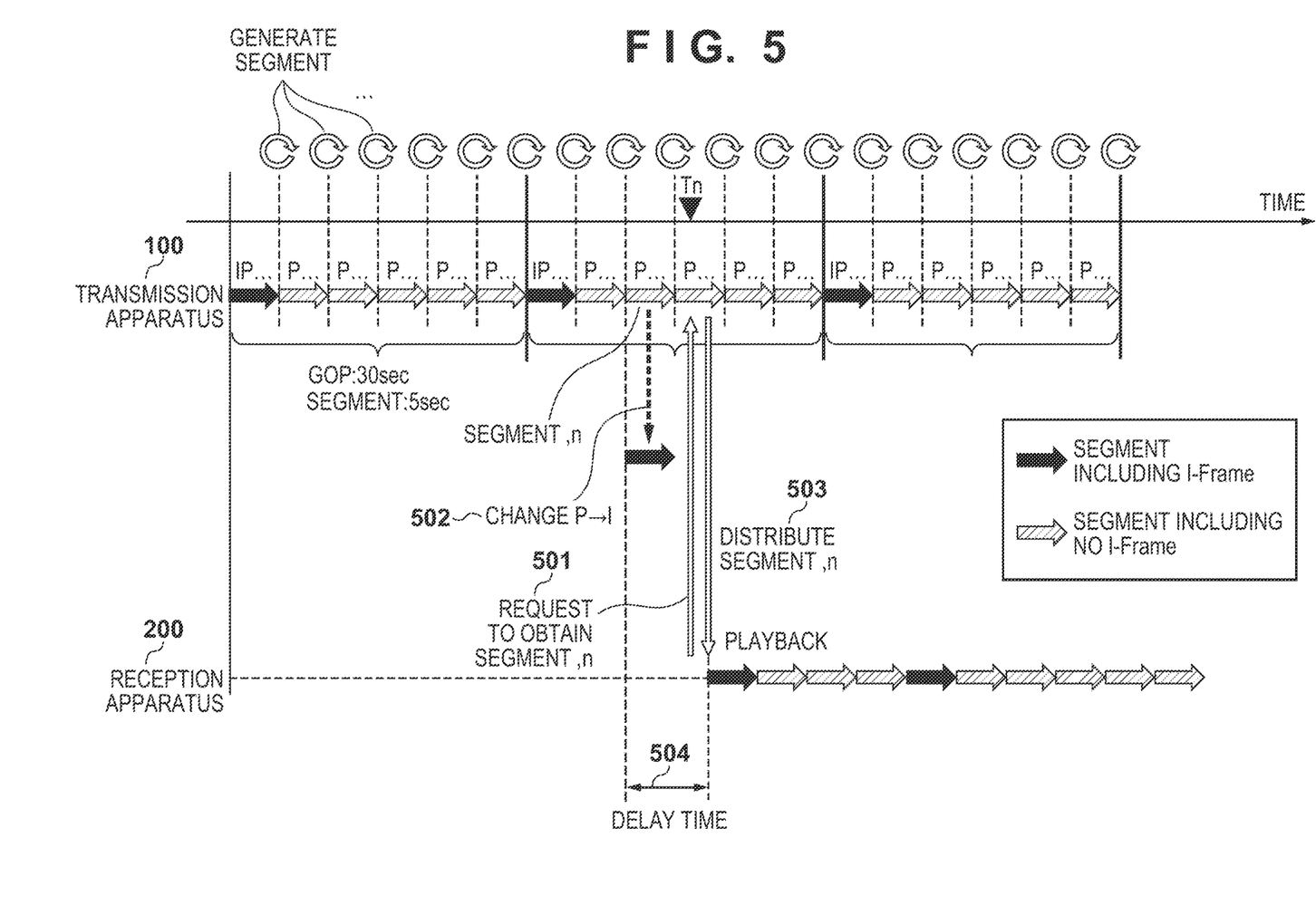
FIG. 5 is a view for explaining an outline of segment generation.

FIG. 5 shows an outline of segment generation for reducing the delay time. In FIG. 5, the transmission apparatus 100 divides a GOP having a time length of 30 sec into six portions to generate segments each having a time length of 5 sec. In this case, as soon as frames for 5 sec are generated, segments are sequentially generated. Note that as described above, the GOP starts with an I-Frame, and all subsequent frames are P-Frames. Therefore, among the six segments corresponding to one GOP of 30 sec, the start segment includes an I-Frame, and each of the other segments is formed only by P-Frames without the I-Frame.

In FIG. 5, it is assumed that the transmission apparatus 100 has received an obtainment request 501 of a segment (n) from the reception apparatus 200 at time Tn. At this time, if the requested segment (n) includes no I-Frame, the P-Frame in the start portion of the segment (n) is changed (502) to an I-Frame, and the changed segment (n) is distributed to the reception apparatus 200. Note that the change from a P-Frame to an I-Frame can be executed by re-encoding the target P-Frame as the I-Frame. For example, for a P-Frame obtained by encoding using the immediately preceding I-Frame as a reference, the corresponding frame is encoded to be an I-Frame without using the reference. In addition, an I-Frame may be redundantly generated for the start frame of each segment in advance separately from the generation of a GOP, and the start frame may be replaced when a change is required. Further, in a streaming method using a playlist such as MPEG-DASH (Dynamic Adaptive Streaming over Http), a segment obtainment request is received after the playlist is distributed. Therefore, instead of constantly generating the I-Frame in a redundant manner, the transmission apparatus 100 may redundantly generate the I-Frame only for a predetermined period after the playlist is distributed.

Subsequently, the reception apparatus 200 sequentially obtains each segment every 5 sec and executes play processing to continuously execute moving image play by streaming. As described above, the delay time depends on the time length of the segment. Therefore, in the example shown in FIG. 5, the delay time can be suppressed to a delay time 504 of about 5 sec corresponding to the time length of the segment after the division (to 10 sec corresponding a maximum of two segments).

<Method 2>

Figure 6:
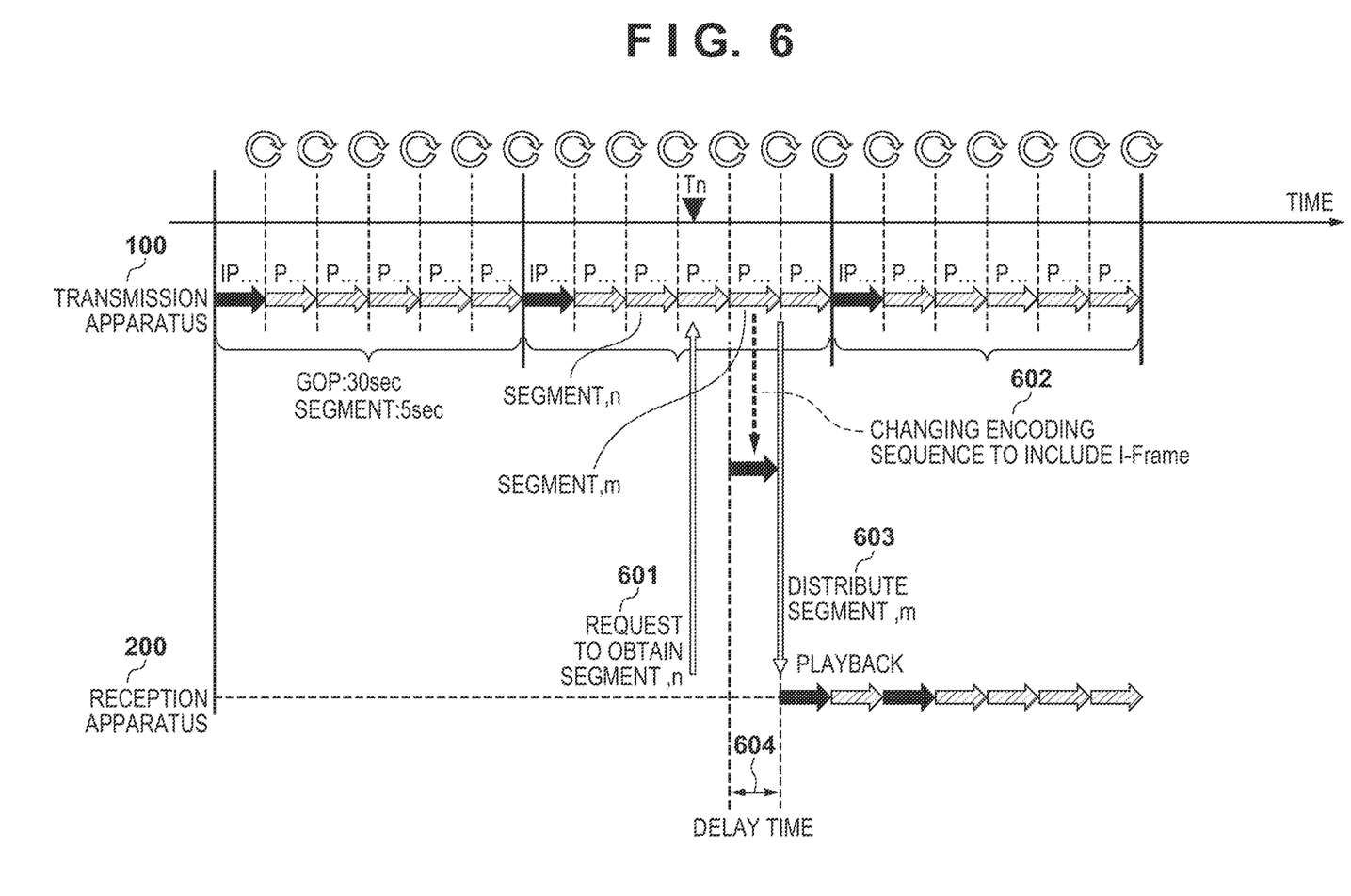
FIG. 6 is a view for explaining another outline of segment generation.

FIG. 6 shows another outline of segment generation for reducing the delay time. In FIG. 6, the transmission apparatus 100 repeats generation of a GOP with an encoded sequence formed by an I-Frame in the start portion and P-Frames in the remaining portion, and generates segments obtained by dividing one GOP. Here, if an obtainment request 601 of the segment (n) is received from the reception apparatus 200 at time Tn, the transmission apparatus 100 determines whether each of the segment (n), a segment currently being generated, and a segment (m) to be generated next is not to include an I-Frame. If each of these segments is not to include an I-Frame, the transmission apparatus 100 performs a change (602) of the encoding sequence such that the segment (m) includes an I-Frame. Then, the transmission apparatus 100 executes distribution (603) of not the segment (n) but the segment (m) to the reception apparatus 200. Accordingly, the segment (m) is distributed immediately after its generation is completed, so that the delay time becomes the length represented by a time 604 in FIG. 6, and the delay can be suppressed to the length corresponding to almost one segment. Note that it is determined here whether each of the requested segment and the next segment is to include an I-Frame, but it may be determined whether an I-Frame is to be included in any one of an arbitrary predetermined number of the segments succeeding the requested segment.

Note that if the segment being generated at time Tn includes an I-Frame, the transmission apparatus 100 can distribute the segment being generated at time Tn without changing the encoding sequence as soon as its generation is completed. In addition, if a segment including a next I-Frame is to be generated within a relatively short predetermined time from the segment (m) to be generated next, the transmission apparatus 100 may distribute the segment including the next I-Frame without changing the encoding sequence.

(Procedure of Processing)

Figure 7:
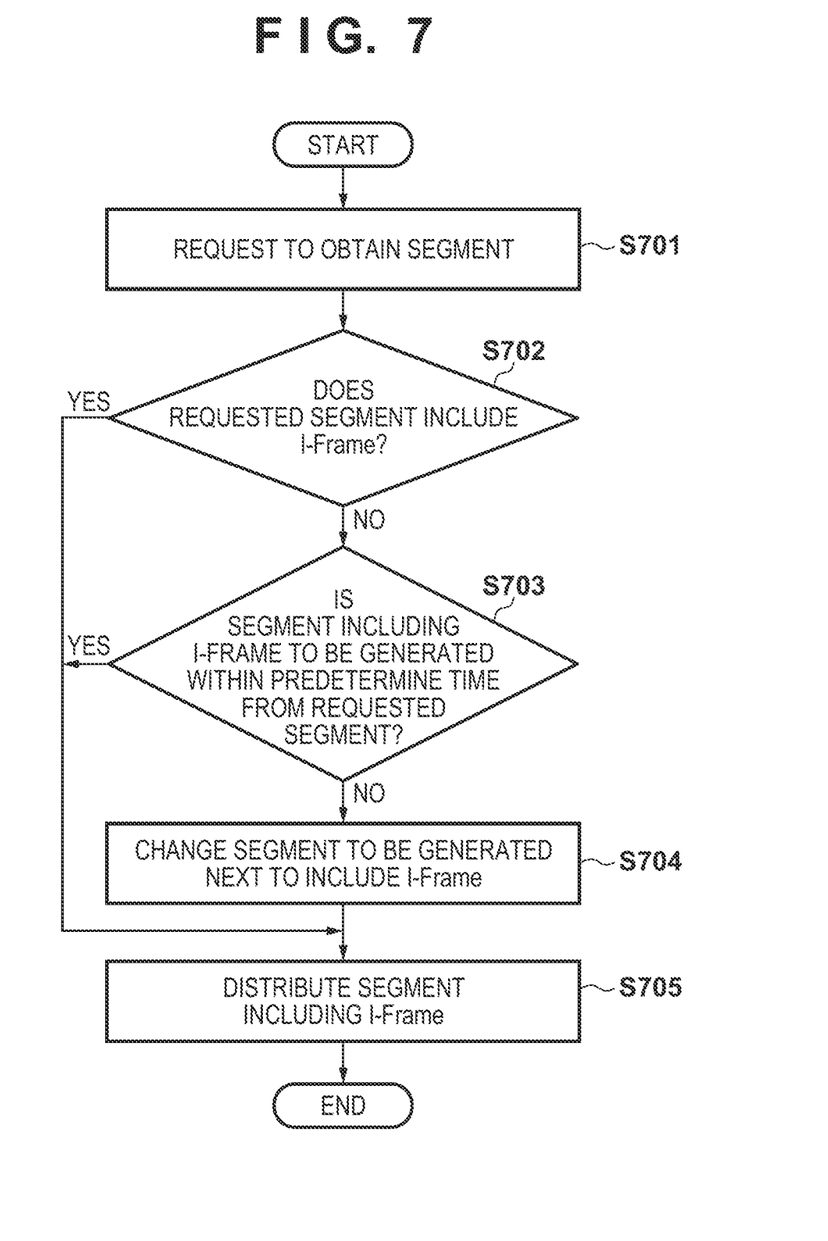
FIG. 7 is a flowchart showing an example of the procedure of processing from an obtainment request to distribution of a segment.

The procedure of a series of processing executed by the transmission apparatus 100 according to this embodiment as described above will be schematically described with reference to FIG. 7. Each step shown in the flowchart of FIG. 7 is executed when, for example, the control unit 122 of the transmission apparatus reads out a program stored in the storage unit 121 and executes it. In FIG. 7, the transmission apparatus 100 receives a segment obtainment request (step S701). Note that in a case of MPEG-DASH, the transmission apparatus 100 exchanges a playlist with the reception apparatus 200 in the processing before step S701, but a description thereof is similar to that of the conventional processing so that it will be omitted herein. The transmission apparatus 100 determines whether the requested segment includes an I-Frame (step S702). If the requested segment includes an I-Frame (YES in step S702), the segment is distributed to the reception apparatus 200 (step S705). On the other hand, if the requested segment includes no I-Frame (NO in step S702), the transmission apparatus 100 determines whether a segment including an I-Frame is to be generated within a predetermined time from the requested segment (step S703). If a segment including an I-Frame is to be generated within the predetermined time (YES in step S703), the transmission apparatus 100 waits for the segment including an I-Frame to be generated, and distributes this segment to the reception apparatus 200 (step S705). If a segment including an I-Frame is not to be generated within the predetermined time (NO in step S703), the transmission apparatus 100 changes the segment to be generated next to include an I-Frame (step S704). Then, the transmission apparatus 100 distributes the segment changed to include an I-Frame to the reception apparatus 200 (step S705). Thus, the transmission apparatus 100 can distribute a segment including an I-Frame to the reception apparatus 200 within a predetermined time.

Note that when a plurality of reception apparatuses are receiving identical streams, if the encoded sequence is changed, the other reception apparatuses are affected by the bit rate variation. Therefore, in order to reduce the influence of the bit rate variation, for example, by degrading the image quality of the I-Frame generated by changing the encoded sequence, the size of the generated I-Frame may be made smaller than that of a normal I-Frame. According to this, it is possible to distribute a segment including an I-Frame to the reception apparatus that has received no I-Frame, and to constantly maintain the bit rate for the reception apparatus that has already obtained an I-Frame.

Note that according to MPEG-DASH, a server generates a plurality of streams having different resolutions, bit rates, or the like, and a client can dynamically switch the stream to be received. At this time, when switching the stream, the client cannot play the switched stream unless a segment including an I-Frame for the switched stream has been obtained. Therefore, the server can apply the above-described method not only at the time of starting streaming but also at the time of switching streaming. That is, when switching to a different stream is performed, the above-described processing is executed at that timing, and a segment including an I-Frame is provided to the client. Thus, the delay time can be suppressed not only at the time of starting streaming but also at the time of switching streaming.

Note that the description described above is premised to use the H.264 standard, but the present invention is not limited to this. That is, the above discussion can be applied to a media file of an arbitrary format formed by predetermined reference data such as an I-Frame, which is a part of media data and serves as a reference for play, and another data for play of the media data using the reference data. A transmission apparatus generates a segment corresponding to the media data portion of a predetermined time length including the above-described predetermined reference data, and a segment corresponding to the media data portion of the predetermined time length including no reference data. Then, if a signal requesting a segment including no predetermined reference data is received from a reception apparatus that has received no predetermined reference data, the transmission apparatus transmits, for example, the requested segment after converting it into a segment including the predetermined reference data. Thus, it is possible to reduce the time until the reception apparatus can obtain the data necessary for play of the media data.

Note that in the description described above, it has been described that the transmission apparatus 100 generates a playlist and transmits it to the reception apparatus 200, but the present invention is not limited to this. For example, the transmission apparatus 100 may sequentially notify a generation apparatus, that generates the playlist, of the information of the segment whose generation has been completed, and the generation apparatus may generate the playlist based on the notification. In this case, the transmission apparatus 100 itself need not generate the playlist.

According to the present invention, it is possible to shorten a delay time related to media data distribution.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034736, filed Feb. 27, 2019, which is hereby incorporated by reference herein in its entirety.

What is claimed is:

1. A transmission apparatus that transmits media data to a reception apparatus, comprising:
   one or more processors; and
   one or more memories, which stores one or more computer-readable instructions that cause, when executed by the one or more processors, the transmission apparatus to:
   generate a plurality of segments respectively corresponding to a predetermined time length portion of the media data, the plurality of segments including a first segment including predetermined reference data serving as a reference for play of the media data, and a plurality of second segments not including the predetermined reference data; and
   transmit generated segments to the reception apparatus in response to a request for a segment from the reception apparatus,
   wherein in the transmission, in a case where the segment requested by the reception apparatus is a second segment among the plurality of second segments not including the predetermined reference data, the requested second segment is changed to the first segment including the predetermined reference data and then transmitted to the reception apparatus.

2. The apparatus according to claim 1, wherein
   the predetermined reference data is data obtained by encoding, without using the reference, a portion of the media data of a predetermined time length corresponding to the first segment, and
   in the transmission, the requested second segment is changed to the first segment by encoding, without using the reference, a portion included in the predetermined time length portion of the media data corresponding to the requested second segment to be the predetermined reference data.

3. The apparatus according to claim 1, wherein
   the predetermined reference data is data obtained by encoding, without using the reference, a portion of the media data of the predetermined time length corresponding to the first segment,
   in the generation, when each of the plurality of second segments is generated, predetermined data encoded without using the reference is generated in advance for a portion included in the predetermined time length portion of the media data corresponding to the each of the plurality of second segments, and
   in the transmission, the requested second segment is changed to the first segment by replacing the portion of the requested second segment with the predetermined data generated in advance.

4. The apparatus according to claim 3, wherein
   the reception apparatus requests the segment based on a playlist including the media data, and
   in the generation, the predetermined data is generated when the plurality of second segments is generated only for a predetermined period after the playlist is distributed to the reception apparatus.

5. The apparatus according to claim 4, wherein the playlist is a playlist of MPEG (Moving Picture Experts Group)-DASH (Dynamic Adaptive Streaming over Http).

6. The apparatus according to claim 1, wherein
   in the transmission, if a segment is requested by the reception apparatus to which the predetermined reference data has been transmitted, or if a segment requested by the reception apparatus to which the predetermined reference data has not been transmitted is the first segment, the change is not performed.

7. The apparatus according to claim 1, wherein
   in the transmission, even if a segment requested by the reception apparatus to which the predetermined reference data has not been transmitted is the second segment not including the predetermined reference data, if any one of a predetermined number of segments succeeding the requested second segment is to be the first segment, the change is not performed, and the first segment is transmitted as the requested segment to the reception apparatus.

8. The apparatus according to claim 1, wherein
   the predetermined reference data is an I-Frame of an H.264 standard.

9. The apparatus according to claim 1, wherein
   in the transmission, if the requested second segment is changed to the first segment, a segment with lower image quality than the first segment that is not the first segment changed from the requested second segment is transmitted as the changed segment.

10. A transmission method of transmitting media data to a reception apparatus performed by a transmission apparatus, the method comprising:
    generating a plurality of segments respectively corresponding to a predetermined time length portion of the media data, the plurality of segments including a first segment including predetermined reference data serving as a reference for play of the media data, and a plurality of second segments not including the predetermined reference data; and
    transmitting generated segments to the reception apparatus in response to a request for a segment from the reception apparatus,
    wherein in the transmitting, in a case where the segment requested by the reception apparatus is a second segment among the plurality of second segments not including the predetermined reference data, the requested second segment is changed to the first segment including the predetermined reference data and then transmitted to the reception apparatus.

11. A non-transitory computer-readable storage medium that stores a program for causing a computer provided in a transmission apparatus that transmits media data to a reception apparatus to:
    generate a plurality of segments respectively corresponding to a predetermined time length portion of the media data, the plurality of segments including a first segment including predetermined reference data serving as a reference for play of the media data, and a plurality of second segments not including the predetermined reference data; and
    transmit generated segments to the reception apparatus in response to a request for a segment from the reception apparatus,
    wherein in the transmission, in a case where the segment requested by the reception apparatus is a second segment among the plurality of second segments not including the predetermined reference data, the requested second segment is changed to the first segment including the predetermined reference data and then transmitted to the reception apparatus.

* * * * *